United States Patent [19]

Kanda et al.

[11] Patent Number: 4,721,577

[45] Date of Patent: Jan. 26, 1988

[54] STABILIZED FRACTURING FLUID AND METHOD OF STABILIZING FRACTURING FLUID

[75] Inventors: Shoichi Kanda, Kanagawa; Makoto Yanagita, Tokyo; Yukihiko Sekimoto, Saitama, all of Japan

[73] Assignee: Nitto Chemical Industry Co., Ltd., Tokyo, Japan

[21] Appl. No.: 869,624

[22] Filed: Jun. 2, 1986

[30] Foreign Application Priority Data

May 31, 1985 [JP] Japan .................................. 60-116506

[51] Int. Cl.$^4$ ............................................. E21B 43/26
[52] U.S. Cl. ............................... 252/8.551; 252/315.3; 536/114
[58] Field of Search ................. 252/8.51, 8.551, 315.3; 536/114

[56] References Cited

U.S. PATENT DOCUMENTS

| | | | |
|---|---|---|---|
| 4,151,096 | 4/1979 | Jackson | 252/8.51 X |
| 4,486,317 | 12/1984 | Sandell | 252/8.51 X |
| 4,514,318 | 4/1985 | Rodriguez | 252/315.3 |
| 4,552,668 | 11/1985 | Brown et al. | 252/8.551 X |
| 4,606,831 | 4/1986 | Kegeler et al. | 252/315.3 X |

*Primary Examiner*—Herbert B. Guynn
*Attorney, Agent, or Firm*—Sughrue, Mion, Zinn, Macpeak, and Seas

[57] ABSTRACT

A stabilized fracturing fluid and a method of stabilizing a fracturing fluid containing at least one of guar gum and its derivatives is disclosed, wherein at least one stabilizing compound selected from the thiol derivatives of heterocyclic compounds is added to the fracturing fluid. This method of stabilization prevents degradation of the fracturing fluid, i.e., reduction in its rheological properties at high temperatures and permits smooth practice of the fracturing operation.

10 Claims, No Drawings

STABILIZED FRACTURING FLUID AND METHOD OF STABILIZING FRACTURING FLUID

FIELD OF THE INVENTION

The present invention relates to a stabilized fracturing fluid and to a method of stabilizing a fracturing fluid. More particularly, the present invention relates to a stabilized fracturing fluid and a method of stabilizing a fracturing fluid whereby a reduction in rheological properties of the fracturing fluid at high temperatures is prevented, thereby permitting smoothly carrying out a fracturing operation.

BACKGROUND OF THE INVENTION

In recent years, in order to increase the production of oil and gas, a fracturing technique has been widely used in which a fluid is injected under high pressure in rock forming oil and gas layers so as to break the rock and form cracks therein and, at the same time, a proppant (propping agent), such as coarse sand, is introduced to hold or maintain the cracks, thereby accelerating the production of oil and gas.

As a fluid for use in this fracturing, that is, a fracturing fluid, water with a polymer dissolved therein or with a polymer dissolved and cross-linked therein is mainly used. One of major functions required for the fluid is to have such rheological properties as to make it possible to form cracks in the reservoir and to convey a proppant thereinto. Another feature is that the fluid has only a small leak-off. As polymers for use in the fluid, guar gum and/or derivatives thereof, such as hydroxypropylguar, hydroxyethylguar and carboxymethylguar are mainly used.

Recently, commercially successful exploration of oil and gas is difficult unless the oil and gas are prospected in a deeper stratum. For this reason, the temperature of the stratum tends to rise and, in many cases, it reaches 90° C. or more.

At such high temperatures, the guar gum and/or derivatives thereof used in the fracturing fluid are deteriorated or decomposed. This leads to a reduction in rheological properties of the fracturing operation and creates a serious obstacle to the fracturing operation. Accordingly, the inherent functions of the fracturing fluid can be satisfactorily obtained only if degradation (e.g., caused by decomposition) of its rheological properties can be prevented even at elevated temperatures.

SUMMARY OF THE INVENTION

The present invention is intended to overcome the above problems and an object of the present invention is to provide a stabilized fracturing fluid and a method whereby a fracturing fluid containing guar gum and/or derivatives thereof is prevented from degradation at elevated temperatures.

It has been found that the above described object can be attained by adding thiol derivatives of heterocyclic compounds to the fracturing fluid.

The present invention is directed to a stabilized fracturing fluid containing at least one of guar gum and its derivatives and a stabilizing amount of at least one stabilizing compound selected from the thiol derivatives of heterocyclic compounds, and a method of stabilizing a fracturing fluid containing at least one of guar gum and its derivatives, which comprises adding at least one stabilizing compound selected from the thiol derivatives of heterocyclic compounds to the fracturing fluids.

DETAILED DESCRIPTION OF THE INVENTION

In accordance with the present invention, at least one compound selected from the thiol derivatives of heterocyclic compounds is added to the fracturing fluid containing at least one of guar gum and its derivatives. Addition of such compounds provides a fracturing fluid having rheological properties much superior to those of the conventional fracturing fluids.

Suitable examples of the thiol derivatives of heterocyclic compounds for use in the method of stabilization of the present invention are 2-thioimidazolidone (formula (1)), 2-mercaptothiazoline (formula (2)), benzooxazole-2-thiol (formula (3)), N-pyridineoxide-2-thiol (formula (4)), 1,3,4-thiadiazole-2,5-dithiol (formula (5)), and 4-ketothiazolidine-2-thiol (formula (6)).

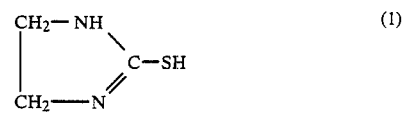

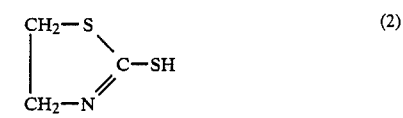

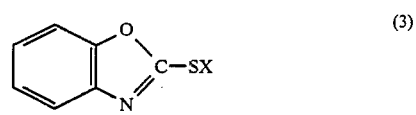

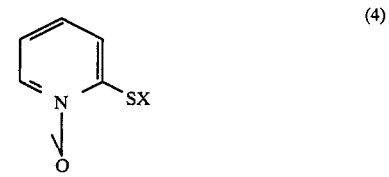

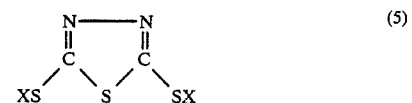

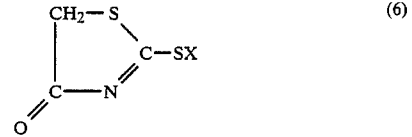

In the above formulae, X is a hydrogen atom, an alkali metal (e.g., Na, K, etc.) or ammonium.

In accordance with the present invention, at least one stabilizing compound selected from the thiol derivatives of heterocyclic compounds is added to the fracturing fluid. The amount of the stabilizing compound added is preferably 0.001 to 0.1 part by weight, more preferably 0.005 to 0.05 part by weight, per 100 parts by weight of the fracturing fluid. If the amount of the stabilizing compound added is less than 0.001 part by weight, the stabilization effect is poor. On the other hand, even if the stabilizing compound is added in an amount in excess of 0.1 part by weight, no additional effect can be obtained, that is, the effect obtained by addition of more than 0.1 part by weight of the stabilizing compound is almost the same as that obtained by addition of 0.1 part by weight of the stabilizing compound. Thus, addition of the stabilizing compound in such an amount as to exceed 0.1 part by weight is not preferred from an economic standpoint.

The stabilizing compound of the present invention can be added to the fracturing fluid in various manners. For example, the stabilizing compound may be added directly to the fracturing fluid, or it may be previously added to guar gum and/or its derivatives, or it may be added during the production of guar gum and/or its derivatives.

Guar gum as used herein is obtained from seeds of a bean plant called Cyamopsis Tetragonoloba and is widely used. Its derivatives such as hydroxypropylguar, hydroxyethylguar and carboxymethylguar are also widely used.

The total content of guar gum and its derivatives in the fracturing fluid is generally from 0.01 to 30 wt%, preferably 0.02 to 15 wt%, based on the total weight of the fracturing fluid.

Additives which are commonly used in conventional fracturing fluids, such as a tackifier (e.g., hydroxyethyl cellulose and carboxymethylhydroxyethyl cellulose), hydrocarbons, methanol, a cross-linking agent, a surfactant, a pH adjusting agent, a fluid loss-adjusting agent, a proppant, and a clay swell-inhibiting agent can be added to the fracturing fluid.

The fracturing fluid with the stabilizing compound and the method of stabilizing a fracturing fluid according to the present invention improve the rheological characteristics of the fracturing fluid after being stored at a temperature as high as about 90° to 200° C., that is, its apparent viscosity (AV), plastic viscosity (PV) and yield point (YP) are high as compared with those of the conventional fracturing fluids. Thus, when the fracturing fluid stabilized by the method of the present invention is used, the fracturing operation can be carried out smoothly.

The present invention is described below in greater detail with reference to the following non-limiting examples.

In the field, the reproducibility of fracturing fluid degradation determinations is a problem because of the difficulty of controlling the conditions of temperature and pressure. Thus, in testing the following examples, the fracturing fluids were aged at a high temperature in a roller oven. Then, its rheological properties were measured at 25° C. with a Fann VG meter Model 35, and the method of stabilization of the present invention was compared with the conventional method using fracturing fluids not containing the stabilizing compounds of the present invention.

EXAMPLES 1 TO 4 AND COMPARATIVE EXAMPLE 1

Guar gum (1 wt% viscosity as measured by the use of a Brookfield viscometer (No. 3 spindle, 6 rpm, 25° C.), 7,800 cp) was dissolved in synthetic sea water (according to ASTM D-1141; hereinafter all references to synthetic sea waters are according to ASTM D-1141) in such a manner that the concentration was 1 wt%, thereby preparing a fracturing fluid. To 100 parts by weight of the fracturing fluid thus prepared was added 2-thioimidazolidone in an amount of 0.003, 0.01, 0.03 or 0.1 part by weight. These fracturing fluids of the present invention and a comparative fracturing fluid not containing 2-thioimidazolidone were each aged at 110° C. for 6 hours. Then, their rheological properties were measured. The results are shown in Table 1.

TABLE 1

| Run No. | Amount of 2-Thioimidazolidone (parts by weight) | AV (cp) | PV (cp) | YP (lb/100 ft$^2$) |
|---|---|---|---|---|
| Comparative Example 1 | None | 10 | 8 | 2 |
| Example 1 | 0.003 | 35 | 21 | 30 |
| Example 2 | 0.01 | 60 | 23 | 73 |
| Example 3 | 0.03 | 64 | 24 | 78 |
| Example 4 | 0.1 | 70 | 25 | 90 |

EXAMPLES 5 TO 8 AND COMPARATIVE EXAMPLE 2

The same guar gum as used in Example 1 was dissolved in synthetic sea water in such a manner that the concentration was 0.8 wt%, thereby preparing a fracturing fluid. To 100 parts by weight of the fracturing fluid thus prepared was added 2-mercaptothiazoline in an amount of 0.003, 0.01, 0.03 or 0.1 part by weight. These fracturing fluids of the present invention and a comparative fracturing fluid not containing 2-mercaptothiazoline were each aged at 120° C. for 8 hours. Then, their rheological properties were measured. The results are shown in Table 2.

TABLE 2

| Run No. | Amount of 2-Mercaptothiazoline (parts by weight) | AV (cp) | PV (cp) | YP (lb/100 ft$^2$) |
|---|---|---|---|---|
| Comparative Example 2 | None | 6 | 5 | 0 |
| Example 5 | 0.003 | 20 | 15 | 13 |
| Example 6 | 0.01 | 50 | 21 | 43 |
| Example 7 | 0.03 | 53 | 22 | 52 |
| Example 8 | 0.1 | 57 | 22 | 61 |

EXAMPLES 9 TO 12 AND COMPARATIVE EXAMPLE 3

The same guar gum as used in Example 1 was dissolved in synthetic sea water in such a manner that the concentration was 1 wt%, thereby preparing a fracturing fluid. To 100 parts by weight of the fracturing fluid thus prepared was added benzooxazole-2-thiol in an amount of 0.002, 0.006, 0.02 or 0.06 part by weight. These fracturing fluids of the present invention and a comparative fracturing fluid not containing benzooxazole-2-thiol were each aged at 100° C. for 3 hours. Then, their rheological properties were measured. The results are shown in Table 3.

TABLE 3

| Run No. | Amount of Benzooxazole-2-thiol (parts by weight) | AV (cp) | PV (cp) | YP (lb/100 ft$^2$) |
|---|---|---|---|---|
| Comparative Example 3 | None | 18 | 17 | 6 |
| Example 9 | 0.002 | 29 | 18 | 16 |
| Example 10 | 0.006 | 34 | 20 | 29 |
| Example 11 | 0.02 | 56 | 22 | 59 |
| Example 12 | 0.06 | 59 | 23 | 68 |

EXAMPLES 13 TO 16 AND COMPARATIVE EXAMPLE 4

The same guar gum as used in Example 1 was dissolved in synthetic sea water in such a manner that the concentration was 0.7 wt%, thereby preparing a fracturing fluid. To 100 parts by weight of the fracturing fluid thus prepared was added 0.003, 0.007, 0.02 or 0.1 part by weight of N-pyridineoxide-2-thiol. These fracturing fluids of the present invention and a comparative fracturing fluid not containing N-pyridineoxide-2-thiol were each aged at 130° C. for 3 hours. Then, their rheological properties were measured. The results are shown in Table 4.

TABLE 4

| Run No. | Amount of N—Pyridineoxide-2-thiol (parts by weight) | AV (cp) | PV (cp) | YP (lb/100 ft$^2$) |
|---|---|---|---|---|
| Comparative Example 4 | None | 5 | 4 | 0 |
| Example 13 | 0.003 | 20 | 13 | 14 |
| Example 14 | 0.007 | 30 | 16 | 31 |
| Example 15 | 0.02 | 39 | 20 | 53 |
| Example 16 | 0.1 | 40 | 20 | 56 |

EXAMPLES 17 TO 20 AND COMPARATIVE EXAMPLE 5

The same guar gum as used in Example 1 was dissolved in synthetic sea water in such a manner that the concentration was 1 wt%, thereby preparing a fracturing fluid. To 100 parts by weight of the fracturing fluid thus prepared was added 1,3,4-thiadiazole-2,5-dithiol in an amount of 0.005, 0.01, 0.05 or 0.1 part by weight. These fracturing fluids of the present invention and a comparative fracturing fluid not containing 1,3,4-thiadiazole-2,5-dithiol were each aged at 140° C. for 6 hours. Then, their rheological properties were measured. The results are shown in Table 5.

TABLE 5

| Run No. | Amount of 1,3,4-Thiadiazole-2,5-dithiol (parts by weight) | AV (cp) | PV (cp) | YP (lb/100 ft$^2$) |
|---|---|---|---|---|
| Comparative Example 5 | None | 6 | 7 | 0 |
| Example 17 | 0.005 | 21 | 12 | 16 |
| Example 18 | 0.01 | 40 | 20 | 33 |
| Example 19 | 0.05 | 50 | 21 | 66 |
| Example 20 | 0.1 | 53 | 22 | 84 |

EXAMPLES 21 TO 24 AND COMPARATIVE EXAMPLE 6

The same guar gum as used in Example 1 was dissolved in synthetic sea water in such a manner that the concentration was 1 wt%, thereby preparing a fracturing fluid. To 100 parts by weight of the fracturing fluid thus prepared was added 4-ketothiazolidine-2-thiol in an amount of 0.005, 0.01, 0.05 or 0.1 part by weight. These fracturing fluids of the present invention and a comparative fracturing fluid not containing 4-ketothiazolidine-2-thiol were each aged at 120° C. for 3 hours. Then, their rheological properties were measured. The results are shown in Table 6.

TABLE 6

| Run No. | Amount of 4-Ketothiazolidine-2-thiol (parts by weight) | AV (cp) | PV (cp) | YP (lb/100 ft$^2$) |
|---|---|---|---|---|
| Comparative Example 6 | None | 9 | 7 | 0 |
| Example 21 | 0.005 | 35 | 21 | 26 |
| Example 22 | 0.01 | 60 | 23 | 73 |
| Example 23 | 0.05 | 63 | 24 | 79 |
| Example 24 | 0.1 | 67 | 24 | 83 |

EXAMPLES 25 TO 28 AND COMPARATIVE EXAMPLE 7

Hydroxypropylguar (1 wt% viscosity as measured by the use of a Brookfield viscometer (No. 3 spindle, 6 rpm, 25° C.), 6,800 cp) was dissolved in synthetic sea water in such a manner that the concentration was 0.6 wt%, thereby preparing a fracturing fluid. To 100 parts by weight of the fracturing fluid thus prepared was added 2-thioimidazolidone in an amount of 0.002, 0.006, 0.02 or 0.06 part by weight. These fracturing fluids of the present invention and a comparative fracturing fluid not containing 2-thioimidazolidone were each aged at 120° C. for 6 hours. Then, their rheological properties were measured. The results are shown in Table 7.

TABLE 7

| Run No. | Amount of 2-Thioimidazolidone (parts by weight) | AV (cp) | PV (cp) | YP (lb/100 ft$^2$) |
|---|---|---|---|---|
| Comparative Example 7 | None | 15 | 9 | 3 |
| Example 25 | 0.002 | 20 | 14 | 26 |
| Example 26 | 0.006 | 25 | 15 | 33 |
| Example 27 | 0.02 | 33 | 17 | 43 |
| Example 28 | 0.06 | 36 | 17 | 50 |

EXAMPLES 29 TO 32 AND COMPARATIVE EXAMPLE 8

The hydroxypropylguar as used in Example 25 was dissolved in synthetic sea water in such a manner that the concentration was 1 wt%, thereby preparing a fracturing fluid. To 100 parts by weight of the fracturing fluid thus prepared was added a 1,3,4-thiadiazole-2,5-dithiol sodium salt in an amount of 0.003, 0.01, 0.03 or 0.1 part by weight. These fracturing fluids of the present invention and a comparative fracturing fluid not containing 1,3,4-thiadiazole-2,5-dithiol sodium salt were each aged at 130° C. for 12 hours. Then, their rheological properties were measured. The results are shown in Table 8.

TABLE 8

| Run No. | Amount of 1,3,4-Thiadiazole-2,5-dithiol Sodium Salt (parts by weight) | AV (cp) | PV (cp) | YP (lb/100 ft$^2$) |
|---|---|---|---|---|
| Comparative Example 8 | None | 20 | 14 | 30 |
| Example 29 | 0.003 | 50 | 29 | 30 |
| Example 30 | 0.01 | 70 | 32 | 55 |
| Example 31 | 0.03 | 74 | 32 | 65 |
| Example 32 | 0.1 | 79 | 33 | 76 |

From the above results, it can be seen that the method of stabilizing a fracturing fluid according to the present invention is quite excellent.

While the invention has been described in detail and with reference to specific embodiments thereof, it will be apparent to one skilled in the art that various changes and modifications can be made therein without departing from the spirit and scope thereof.

What is claimed is:

1. A stabilized aqueous fracturing fluid containing:
(A) at least one of guar gum and derivatives thereof, and
(B) a stabilizing amount of at least one stabilizing compound selected from the thiol derivatives of heterocyclic compounds, wherein said thiol derivatives of heterocyclic compounds are selected from the group consisting of 2-thioimidazolidone (formula (1)), 2-mercaptothiazoline (formula (2)), benzooxazole-2-thiol (formula (3)), N-pyridineoxide-2-thiol (formula (4)), and 4-ketothiazolidine-2-thiol (formula (5)):

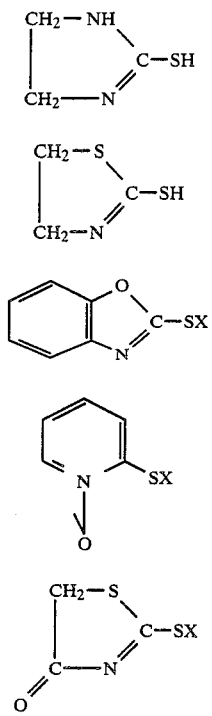

wherein X is a hydrogen atom, an alkali metal or ammonium.

2. The stabilized aqueous fracturing fluid as claimed in claim 1, wherein said guar gum or derivatives thereof is selected from the group consisting of hydroxypropylguar, hydroxyethylguar and carboxymethylguar.

3. The stabilized aqueous fracturing fluid as claimed in claim 1, wherein said stabilizing compound is added in an amount of from 0.001 to 0.1 part by weight per 100 parts by weight of the aqueous fracturing fluid.

4. The stabilized aqueous fracturing fluid as claimed in claim 1, wherein the total content of guar gum and its derivatives in the aqueous fracturing fluid is from 0.01 to 30 weight percent based on the total weight of the aqueous fracturing fluid.

5. The stabilized aqueous fracturing fluid as claimed in claim 4, wherein the total content of guar gum and its derivatives in the aqueous fracturing fluid is from 0.02 to 15 weight percent based on the total weight of the aqueous fracturing fluid.

6. A method of stabilizing an aqueous fracturing fluid containing at least one of guar gum and derivatives thereof which comprises adding at least one stabilizing compound selected from thiol derivatives of heterocyclic compounds to the aqueous fracturing fluid, wherein said thiol derivatives of heterocyclic compounds are selected from the group consisting of 2-thiomidazolidone (formula (1)), 2-mercaptothiazoline (formula (2)), benzooxazole-2-thiol (formula (3)), N-pyridineoxide-2-thiol (formula (4)), and 4-ketothiazolidine-2-thiol (formula (5)):

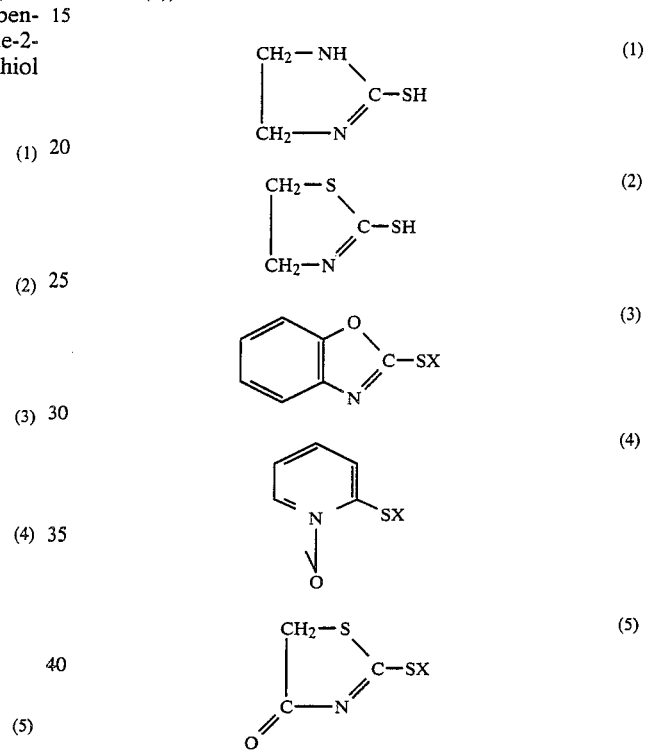

wherein X is a hydrogen atom, an alkali metal or ammonium.

7. The method as claimed in claim 6, wherein said guar gum or derivatives thereof is selected from the group consisting of hydroxylpropylguar, hydroxyethylguar and carboxymethylguar.

8. The method as claimed in claim 6, wherein said stabilizing compound is added in an amount of from 0.001 to 0.1 part by weight per 100 parts by weight of the aqueous fracturing fluid.

9. The method as claimed in claim 6, wherein the total content of guar gum and its derivatives in the aqueous fracturing fluid is from 0.01 to 30 weight percent based to the total weight of the aqueous fracturing fluid.

10. The method as claimed in claim 9, wherein the total content of guar gum and its derivatives in the aqueous fracturing fluid is from 0.02 to 15 weight percent based on the total weight of the aqueous fracturing fluid.

* * * * *